United States Patent
Mikutis et al.

(10) Patent No.: US 12,420,356 B2
(45) Date of Patent: Sep. 23, 2025

(54) METHOD AND DEVICE FOR LASER PROCESSING OF TRANSPARENT MATERIALS

(71) Applicant: UAB ALTECHNA R&D, Vilnius (LT)

(72) Inventors: Mindaugas Mikutis, Vilnius (LT); Orestas Ulcinas, Vilnius (LT); Titas Gertus, Vilnius (LT); Antanas Urbas, Vilnius (LT)

(73) Assignee: UAB ALTECHNA R&D, Vilnius (LT)

( * ) Notice: Subject to any disclaimer, the term of this patent is extended or adjusted under 35 U.S.C. 154(b) by 986 days.

(21) Appl. No.: 17/610,861

(22) PCT Filed: May 14, 2020

(86) PCT No.: PCT/IB2020/054549
§ 371 (c)(1),
(2) Date: Nov. 12, 2021

(87) PCT Pub. No.: WO2020/230064
PCT Pub. Date: Nov. 19, 2020

(65) Prior Publication Data
US 2022/0258278 A1    Aug. 18, 2022

(30) Foreign Application Priority Data
May 15, 2019    (LT) .................................. 2019 028

(51) Int. Cl.
*B23K 26/0622* (2014.01)
*B23K 26/046* (2014.01)
(Continued)

(52) U.S. Cl.
CPC ........ *B23K 26/0624* (2015.10); *B23K 26/046* (2013.01); *B23K 26/0648* (2013.01);
(Continued)

(58) Field of Classification Search
CPC .............. B23K 26/0624; B23K 26/046; B23K 26/0648; B23K 26/38; B23K 26/53;
(Continued)

(56) References Cited

U.S. PATENT DOCUMENTS 9,517,929 B2 * 12/2016 Hosseini .............. B81C 1/00634
9,517,963 B2    12/2016 Marjanovic et al.
(Continued)

FOREIGN PATENT DOCUMENTS

| EP | 3102358 A4 | 10/2017 |
| EP | 3335826 A1 | 6/2018 |
| WO | 2015100056 A1 | 7/2015 |

OTHER PUBLICATIONS

Drevinskas Rokas et al: "Geometric phase holograms imprinted by femtosecond laser nanostructuring", 2016 Conference on Lasers and Electro-Optics (CLEO), OSA, Jun. 5, 2016 (Jun. 5, 2016), pp. 1-2, XP033026326.
(Continued)

*Primary Examiner* — Ibrahime A Abraham
*Assistant Examiner* — Daniel Ward Hatten
(74) *Attorney, Agent, or Firm* — Brown & Michaels, PC

(57) ABSTRACT

The invention is related to fabrication of transparent materials by means of ultra-short laser pulses. Method to fabricate materials transparent in most part to laser wavelength comprises forming non-centrosymmetric, non-diffracting beam by optical element that contains at least two zones of birefringent structures changing Pancharatnam-Berry Phase according to the rule specific for that particular zone. The distribution of energy, phase and polarization depends on parameters of light approaching said element. Pulse energy is selected to employ main maximum of distribution to form voids elongated in desired direction while side maxima form changes of chemical character between damages from adja-
(Continued)

cent pulses. Void damages and zones of chemical changes form desired cut line. The workpiece prepared in said manner is placed in chemically aggressive solution, in which zones affected by laser light are dissolved much faster than non-affected ones. This enables achieving cuts with aspect ration up to 1/50.

6 Claims, 7 Drawing Sheets

(51) Int. Cl.
| | |
|---|---|
| B23K 26/06 | (2014.01) |
| B23K 26/38 | (2014.01) |
| B23K 26/53 | (2014.01) |
| B23K 103/00 | (2006.01) |

(52) U.S. Cl.
CPC .............. *B23K 26/38* (2013.01); *B23K 26/53* (2015.10); *B23K 2103/54* (2018.08)

(58) Field of Classification Search
CPC ............ B23K 26/0093; B23K 26/0736; B23K 26/402; B23K 26/064; B23K 26/067; B23K 26/122; C03C 15/00; C03B 33/0222; C03B 33/04; G02B 1/00
USPC .......................................... 219/121.69, 121.67
See application file for complete search history.

(56) References Cited

U.S. PATENT DOCUMENTS

| | | | |
|---|---|---|---|
| 10,335,902 B2 * | 7/2019 | Bookbinder | B23K 26/0624 |
| 10,526,234 B2 * | 1/2020 | Genier | B23K 26/0676 |
| 2016/0152508 A1 | 6/2016 | Kumkar | |
| 2018/0029924 A1 | 2/2018 | Inoue et al. | |
| 2018/0037489 A1 | 2/2018 | Ono | |
| 2020/0254557 A1 * | 8/2020 | Boek | C03C 15/00 |

OTHER PUBLICATIONS

International Search Report for PCT/IB2020/054549 dated May 10, 2020.

Jisha C P et al: "Nonlinear localization of light using the Pancharatnam-Berry phase", arxiv.org, Cornell University Library, 201 Olin Library Cornell University Ithaca, NY 14853, Nov. 5, 2018 (Nov. 5, 2018), XP080934387.

* cited by examiner

METHOD AND DEVICE FOR LASER PROCESSING OF TRANSPARENT MATERIALS

TECHNICAL FIELD TO WHICH INVENTION RELATES

The present invention belongs to the field of lasers and relates to the processing of transparent media and can be used for cutting, splitting, and other processing of transparent media, including different types of glass, chemically tempered glass, sapphires, and other crystalline materials by using ultra short pulse laser radiation beam.

RELEVANT PRIOR ART

In order to cut holes of very small dimensions or make a free form cuts in workpieces of transparent materials, laser methods are used. Conventional laser microprocessing (drilling, cutting, or groove formation, etc.) methods generally rely on the removal of material due to focusing of the laser pulse energy in the affected area—the ablation. The use of femtosecond lasers for this purpose produces extremely clean edges of holes or cuts, and there is virtually no material that could not be processed by such lasers. However, ablation has a fundamental drawback—it is not possible to remove material from very narrow gaps or small diameter holes due to the fact that the material being removed from the bottom of the cut accumulates on the walls above the affected area, gradually covering the access for the light. This drawback is circumvented by using splitting separation, where the laser pulse creates damage areas along the desired splitting line. However, this method is very limited when it comes to splitting the workpiece along lines of high curvature, and especially when drilling of holes is required. The task becomes more complicated when the workpiece is made of glass, especially if that glass is tempered. Glass has recently become an increasingly important among materials used in semiconductor technology (as the foundation for semiconductor structures), in the manufacture of microelectromechanical systems, and in the manufacture of microfluidic devices. All of these areas require the ability to create cuts, holes or channels of any shape. Lately the combination of laser methods with chemical etching is used, it greatly extends the capabilities of these methods.

Known analogues use acid or alkali etching of laser affected material. US20180029924A1 describes a method wherein ultraviolet laser drilled holes are etched with HF acid, employing the property that the material affected by laser is etched faster than unaffected one. The holes obtained in this way are of different diameter across the thickness of the workpiece (usually hourglass shaped), and during the etching holes expand in all directions uniformly; during the etching of the entire cut line this results in a cut with a width that is almost the same as the pitch between the holes.

The method proposed in US2018037489 also does not exhibit orientation, during etching laser-pierced holes expand evenly in all directions. The method is not intended for making cuts or grooves, but only for circular holes.

U.S. Pat. No. 9,517,963B2 describes a method that employs an even widening of laser pierced holes by etching. In this method, non-diffractive Bessel beam, which is centrosymmetric, is used to pierce the glass, therefore, the holes are circular and non-directional. The method does not offer the option of etching an even cut, it merely facilitates splitting of the workpiece along the line connecting the holes. By using the method described, significant slopes are obtained at the entrances and exits of the holes in the workpiece, i.e., the holes deviate significantly from the cylindrical shape, which also results in a cut with irregularly shaped slopes. Also when piercing holes with a laser, micro-cracks of unpredictable shape form around them, and as the glass etching acid spreads through them, it enlarges the hole while reducing the smoothness of the fracture, which is not uniform along the splitting line due to the random nature of the cracks.

EP3102358A4 describes a method, which utilizes etching of laser-pierced holes to enlarge them and for the purpose of using the holes to break glass along the outline formed from the holes. The orientation of the etching process is neither sought nor is it controlled, the holes are not connected.

US20160152508A1 describes a method for separating glass workpieces along the lines of laser made and etching-enlarged holes. The orientation of the etching process is neither sought nor is it controlled; the holes are not connected.

Using the combined laser and chemical processing methods described above, glass holes can be made in glass pieces of sufficient thickness, this way achieving a glass thickness to a diameter ratio of 20-30 or more. The main problem with them is that after the etching of the affected glass with aggressive acids or their mixtures, such as HF, BHF, $HF+HNO_3$, the shape of resulting holes significantly deviates from the cylinder (e.g. "hourglass") and their edges are not upright, but with a significant slope of 5-10% of the diameter. This is not acceptable for most applications. When etching the affected glass with alkali, such as NaOH or KOH, the geometry of the holes is much more accurate than when using acids, but the process itself is quite slow, the etching of several micrometer long gap requires several hours.

TECHNICAL PROBLEM TO BE SOLVED

The aim of the invention is the improvement of the processing quality of transparent materials when splitting or cutting transparent materials while improving the accuracy of the processing at the same time:

DISCLOSURE OF INVENTION

In order to solve the problem according to the present invention the method of transparent materials processing is proposed by forming a cut or split surface in a workpiece material, comprising two processing phases:

phase A in which cut or split surface formation with a laser without a complete separation of workpiece parts from one another is performed, wherein phase A includes the following steps:

A.1 generating of coherent ultra-short pulse laser radiation beam of $TEM_{00}$ mode by a laser, A.2 directing of the generated laser radiation beam into an optical system that forms the set diameter, total pulse energy, and light polarization of the laser radiation beam, A.3 directing of the laser radiation beam, formed in step A.2, into an optical element which transforms the incoming laser radiation beam in accordance with a predetermined rule, A.4 localization of the formed laser radiation beam in the workpiece, the material of which is mostly transparent to the laser beam radiation, and the predetermined parameters of the laser radiation pulse ensure that the laser radiation energy density, in the focal area of the processed workpiece, is sufficient to change the properties of the workpiece material, A.5 controllable moving of the processed workpiece with respect to the laser radiation beam so that the laser radiation beam focus point in the workpiece shifts respectively, creating the required number of damaged areas and forming the surface of the desired trajectory cut and/or split in the workpiece, phase B in which a complete separation of the workpiece parts from each other based on the trajectory of the cut and/or splitting surface, formed during phase A, is performed by placing the workpiece in a chemical medium etching the workpiece material at the damage area, wherein in the step A.3, the laser radiation beam transformation, according to the predetermined rule, takes place in an optical element (10), which comprises a birefringent structure that smoothly changes the Pancharatnam-Berry phase (PBP) of the perpendicular laser radiation beam, wherein at least two regions of the said structure with different PBP transformation rules and their orientation with respect to the laser radiation beam approaching the element are formed in the optical element (10), wherein at least two said structure regions form at least two sub-beams, respectively, with the ability to change the energy, phase, and polarization distribution of the sub-beams, depending on the parameters of the laser radiation, approaching the optical element (10), such as polarization type meaning linear or circular or radial or azimuthal, and/or orientation of the linear polarization plane with respect to the direction of the cut or split trajectory in the element, wherein the formed said sub-beams interfere with each other to obtain a total non-diffractive laser radiation beam having an off-center symmetrical distribution of the set energy, phase, and polarization focal line, with a better elongation in a plane, perpendicular to the laser radiation beam propagation direction, where the desired form of the aforesaid distribution can be obtained by changing the parameters of laser radiation, formed during step A.2, approaching the optical element (10), wherein the off-center symmetrical distribution of the non-diffractive laser radiation beam has main oblong energy maximum in the perpendicular plane of light propagation, which contains most of energy of the pulse with the density $\rho$, and the secondary energy maximums elongated in the said plane, with the energy density between $\rho/6$ and $\rho/3$, localizing the obtained total laser radiation beam in a workpiece, wherein each laser radiation pulse forms an elongated general damage region consisting of physical changes, formed by cavities and/or cracks due to the effect of the said primary energy maximum and chemical changes in the workpiece material due to effects of the said secondary energy maxima, wherein the general damage region in the workpiece is oriented along the cutting and/or splitting trajectory by rotating the element (10) around its axis and moving the processed workpiece in a controlled manner so that the formed elongated areas of damage position themselves lengthwise one after another, due to physical changes in the workpiece material, with gaps along cut and/or split trajectory, while in the steps A4 and A5, the laser pulse energy and power and workpiece movement speed are selected such that the damage areas, due to chemical changes in the workpiece material, extend the damage areas, that occurred due to physical changes in damage, along the cut trajectory to such extent that adjacent common damage areas adjoin or partially overlap; and in phase B chemical medium would act on the workpiece material simultaneously throughout the entire cut trajectory.

The elongated common areas of damage formed are in an elliptical plane perpendicular to the direction of propagation of light and of approximately constant size, varying by no more than +/−15% from the mean value along the said direction.

The trajectory of the cut or split surface is formed from said elongated common areas of damage by spreading more than one non-diffractive beam along the trajectory of the cut or splitting surface at distances comparative to the transverse dimensions of the beam.

The elongated damage due to physical changes in the workpiece are arranged with a step that exceeds the width of the damage by at least 1.5 times.

In the step B the workpiece is successively immersed into several selected chemically active liquids, such as KOH, $Na_2CO_3$, HF, HCl solutions, in order to transfer and dissolve the products of the previous chemical reaction, formed and remaining in the region of workpiece damage, in another solution affecting the workpiece.

According to another embodiment of the invention is proposed device for processing of transparent materials, comprising a laser generating a beam of ultrashort pulse laser radiation $TEM_{00}$ mode (2), directed at an optical system for changing the pulse energy, light polarization, and diameter of a laser radiation beam, whereby the laser radiation beam formed in the optical system is localized through the optical element, intended to transform incoming beam in accordance with the predetermined rule, in the processed workpiece, whereby the workpiece material is mostly transparent to the laser radiation beam, the selected laser radiation beam pulse parameters formed in the optical system ensure laser radiation energy density sufficient to change the properties of the workpiece material in the focal area, controllable positioning mechanism, intended for moving processed workpiece with respect to the laser radiation beam so that the laser radiation beam focus point in the aforesaid workpiece moves, creating the required number of damaged areas and forming the surface of the desired trajectory cut and/or split in the workpiece, a vessel containing a chemical medium, etching the workpiece material in the damage area, and intended to place the workpiece therein and to separate its parts from each other according with the formed trajectory of the cutting and/or splitting surface, wherein the optical element located outside the optical system in the path of the laser radiation beam, intended for transforming the incoming laser radiation beam in accordance with the predetermined rule has a birefringent structure that uniformly changes the Pancharatnam-Berry phase (PBP) of the perpendicular laser radiation beam, whereby at least two regions of the birefringent structure with different PBP transformation rules and their orientation with respect to the laser radiation beam approaching the element, are located in the workpiece, where the said structure regions form at least two interfering sub-beams to produce a total non-diffractive laser radiation beam having an off-center symmetrical distribution of the predefined energy, phase, and polarization focal line, with a better elongation in a plane, perpendicular to the laser radiation beam propagation direction, with main energy maximum and secondary energy maximums, wherein the optical element mounted on a mounting mechanism rotating around its axis for changing the position of the element and the birefringent structures formed therein, said total non-diffractive laser radiation beam, formed by element, is localised in the workpiece via focusing optics, whereby rotating the optical element by said mechanism the orientation of the formed elongated damage area along the trajectory of the cutting line is changed, and controllable positioning mechanism moves the workpiece in a way that the formed elongated common areas of damage, consisting of physical and chemical changes in the workpiece material, arranges lengthwise one after another along the cutting and/or splitting trajectory, so that the formed elongated areas of damage position themselves lengthwise one after another, due to physical changes in the workpiece material, with gaps along cut and/or split trajectory, and the damage areas, due to chemical changes in the workpiece material, extend the damage areas, that occurred due to physical changes in damage, along the cut trajectory to such extent that adjacent common damage areas adjoin or partially overlap.

ADVANTAGES OF THE INVENTION

The proposed laser-chemical processing method for workpieces allows to obtain precise geometry cuts or holes over a time, which is 10 times or more faster than the known methods of Laser Assisted Chemical Etching (LACE) or Laser Induced Chemical Etching (LICE).

The proposed invention makes it possible to etch a laser-formed narrow joined line of physically and chemically oriented damage areas. In the present invention, the overall damage occurs due to the changes in the structure of the workpiece material, involving the formation of holes, self-arranging structures, mechanical stresses, and chemical changes involving the rearrangement of chemical bonds or the formation of free bonds.

In the proposed method, the oblong cross-section beam at the highest intensity point produces physical damage (up to the puncture of the hole), and the lower intensity area spreads along the direction of the cut line and alters the chemical properties of the material. The resulting overall damage area improves processing accuracy by achieving a cut width to depth ratio of up to 1:100, without deviating from perpendicular axis more than 2°, and maintaining slopes of cuts no bigger than 0.1 µm. The surface irregularities of the etched cut shall not exceed 2 µm, their slope shall not exceed 0.1 µm, and the cuts shall not have overlaps. Therefore, products made with the use of this method can be used in applications requiring high precision and perpendicularity, such as guide spacers for semiconductor device test boards, which significantly extends their service life.

The absence of slopes and overlaps allows the use of products for plane bridging without additional polishing after chemical treatment, which speeds up the production of microelectromechanical systems (MEMS) and microfluidic devices.

The invention will be explained in more detail in the following drawings, which do not limit the scope of the invention, and which contain:

DESCRIPTION OF CARRYING OUT THE INVENTION

Figure 1:
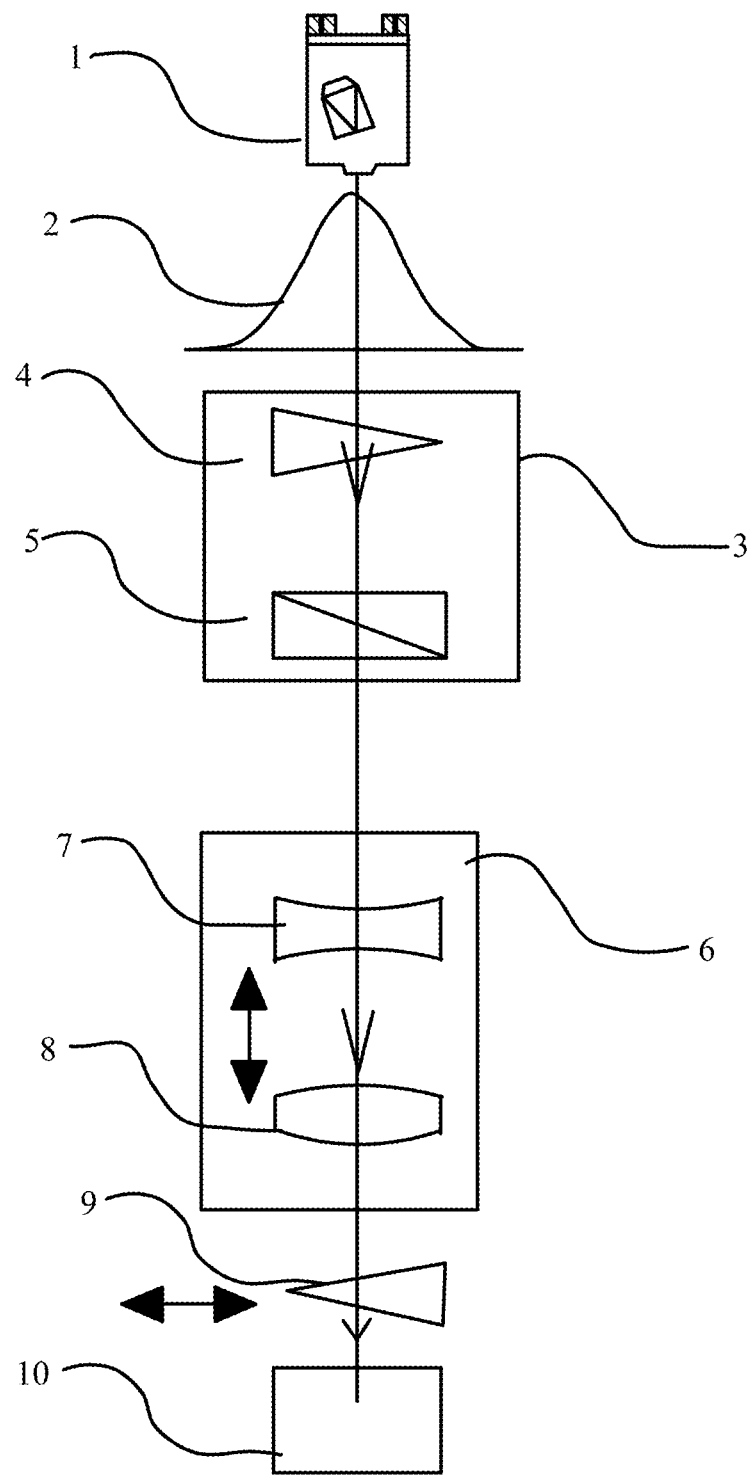
FIG. 1 shows a part of a schematic block diagram of a proposed transparent material processing device, explaining formation of the laser beam prior to its passage into an optical element that forms the distribution.
Figure 2:
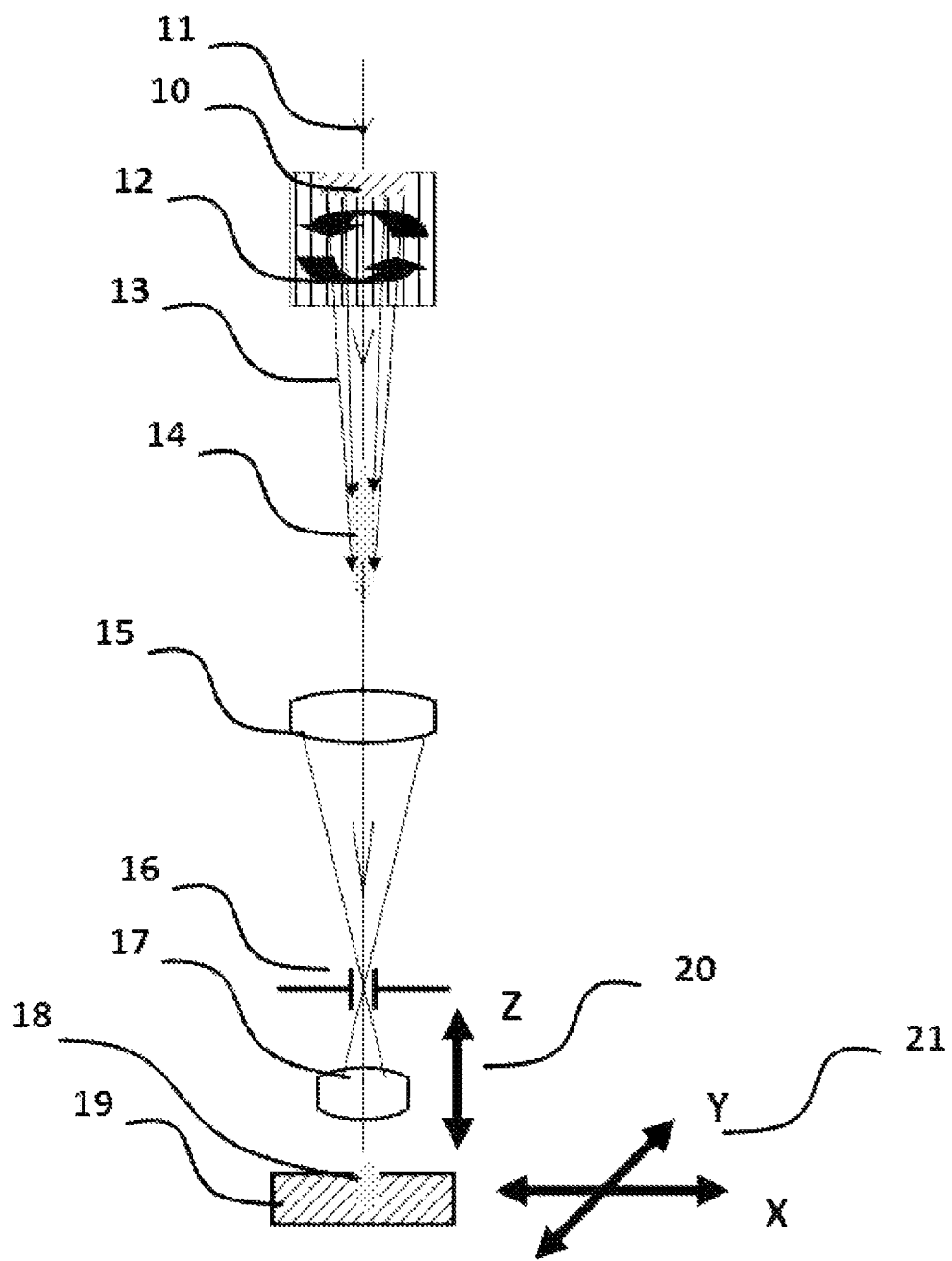
FIG. 2 shows a part of a schematic diagram of a proposed transparent material processing device, which shows how the desired distribution is formed and how it is placed in the processed workpiece.

The proposed method for processing of transparent materials includes the following sequence of operations:

The method of transparent material processing has two processing phases:

Cut or split surface formation with a laser without a complete separation of workpiece parts from one another is performed during Phase A. Phase A includes the following steps: A.1. —generates a coherent ultra-short pulse laser radiation beam of $TEM_{00}$ mode by a laser. A.2—directs the generated laser radiation beam into an optical system that forms the set diameter, total pulse energy, and light polarization of the laser radiation beam, A.3—directs the laser radiation beam, formed in step A2, into an optical element which transforms the laser radiation beam in accordance with the predetermined rule. This transformation takes place in the optical element, where a birefringent structure that uniformly changes the Pancharatnam-Berry phase (PBP) of the laser beam perpendicularly aimed at it, is formed. At least two of areas of the said structure are formed in the said optical element, with different PBP change rules and their orientation with respect to the laser beam perpendicularly aimed at it. At least two said areas of the structure form respectively at least two sub-beams, with the possibility of changing the distribution of the sub-beam energy, phase, and polarization depending on parameters of light aimed at the said optical element, such as polarization type (such as linear or circular or radial or azimuthal), and/or linear polarization plane orientation with respect to the direction of the cut or split trajectory in the element. The formed said sub-beams interfere with each other to obtain a total non-diffractive laser radiation beam having an off-center symmetrical distribution of the set energy, phase, and polarization focal line, with a better elongation in a plane, perpendicular to the laser radiation beam emanation direction, where the desired form of the aforesaid distribution can be obtained by changing the parameters of laser radiation, formed during step A.2, aimed at the said optical element. The aggregate laser radiation beam obtained in step A.4 is localized in the workpiece, where each pulse of laser radiation forms an oblong shape overall area of damage consisting of physical and chemical changes in the workpiece material.

The material of the workpiece in which the laser radiation beam is localised, is mostly transparent to the laser radiation beam, and the set parameters of the laser radiation pulse ensure that the laser radiation energy density, in the focal area of the processed workpiece, is sufficient to change the properties of the workpiece material. In step A5, the overall damage areas in the workpiece are oriented along the cut and/or split trajectory by rotating said optical element around its axis, and the processed workpiece is moved in a controlled manner so that the formed elongated areas of damage position themselves lengthwise one after another with gaps along cut and/or split trajectory. The laser pulse energy and power and workpiece movement speed are selected such that the damage areas that form due to chemical changes in the workpiece material, extend the damage areas, that occurred due to physical changes in damage, along the cut trajectory to such extent that adjacent common damage areas merge or overlap. The elongated common areas of damage formed are better in an elliptical plane perpendicular to the direction of propagation of light and of approximately constant size, varying by no more than +/−15% from the mean value along the said direction. The trajectory of the cut or split surface is formed from said elongated common areas of damage by spreading more than one non-diffractive beam along the trajectory of the cut or splitting surface at distances comparative to the transverse dimensions of the beam. The elongated damage due to physical changes in the workpiece are arranged with a step that exceeds the width of the damage by at least 1.5 times.

Next, a complete separation of the workpiece parts from each other based on the trajectory of the cut and/or splitting surface, formed during Phase A, is performed during Phase B by placing the workpiece in a chemical medium etching the workpiece material at the damage area. Because common areas of damage formed along the cut or slit trajectory are adjacent or overlap, the chemical medium affects the workpiece simultaneously throughout the cut or split surface trajectory, and the workpiece material affected in this trajectory is dissolved much faster than the unaffected part of the workpiece. After keeping the workpiece in a solution for a required period of time, the reagent dissolves the workpiece material along the cut line, extending it slightly perpendicularly to the line, and parts of workpiece are separated from one another. The chemical medium in which the workpiece is placed after treatment with a laser radiation beam in Phase A, may be a solution of KOH, but it is better to place the workpiece into several solutions of chemically active liquids such as KOH, $Na_2CO_3$, HF, and HCl sequentially. After removing the workpiece from one chemical medium solution, it is placed in another chemical medium solution, which dissolves the products of the previous chemical reaction that have formed and remained in the area of the workpiece damage. This way the workpiece is placed in a different chemical medium solution until the parts of the workpiece separate from one another very precisely without any transverse cracks.

The laser (1) is used for the splitting of transparent materials in a proposed way, (FIG. 1) ultra-short (100 fs-10 ps duration) light pulses of $TEN/1_{00}$ mode are generated, they have an energy distribution in cross section (2) described by the Gaussian formula $$I(r)=I(0)\exp(-2r^2/\omega_0^2) \quad [1]$$

Where I(r) is the light intensity at the point on the beam with a distance r from the beam axis, I(0) is the light intensity in the beam axis, $\omega_0$ is the distance from the axis to the point where I(r)=I(0)/e.

The light intensity in the beam is controlled by a tunable attenuator (3) consisting of a half-wave plate (4), and a polarizer (5) the polarization plane of which is adapted to pass all the light coming from the laser in the absence of the plate (4) in its path. By rotating the direction of the plate's slow axis with respect to the plane of polarization of the laser light, the direction of polarization of the light that passed plate is rotated accordingly, and as the polarizer (5) lets through only the light component parallel to the polarization of the light emitted by the laser, 0% to 100% of the light coming from the laser can be allowed to pass depending on the turning angle of the plate (3).

The diameter of the light beam that passed the attenuator is set by the adjustable extender (6), which consists of a set of negative (7) and positive (8) lenses. By adjusting the distance between the lenses, the required diameter of the beam leaving the extender is achieved.

If it is necessary to give the light beam an elliptical polarization, a quarter-wave plate (9) is placed in its path, the angle of its slow axis with the polarization plane of the light aimed at it, sets the degree of ellipticity and the direction of rotation of the circular polarization (left or right).

An optical element (10) made of a flat, transparent material workpiece, in which a structure that changes Pancharatnam-Berry phase (PBP) of light is formed, is placed in the path of the laser light beam.

The diameter of the laser beam is selected such that the beam completely fills the working area of the beam forming element. This means that the light intensity at distance $R_E$ from the beam axis must not be greater than $I(R_E) \leq I(0)/e^2$, in other words, the element radius must be not less than twice the Gaussian beam radius in formula [1], i.e., $$R_E \geq 2\omega_0 \quad [2]$$

By placing a beam forming element (10) with a PBP, varying in its cross-section, into the laser beam (11), the polarization plane is rotated according to the predetermined rule at different locations in the element and the required phase delay is introduced. The element is mounted on a turning mechanism (12), which makes it possible to change the position of the element and at the same time the structures recorded thereon with respect to the plane of polarization aimed at the element. The light beams (13), emanating from various parts of the element, interfere with each other in a constructive and destructive way, allowing to form the desired distributions of energy, phase, and polarization (14). The formed distribution with the shape (18) is transferred through the focusing optics (15,16,17) into the workpiece (19). At least part of the focusing optics forms a 4f scheme that is used to add an additional amplitude function to the Fourier plane (16), such as filtering out of unwanted amplitude spectrum elements while forming the required distribution in the focal line. The position of the focal region in the axis Z is determined by the height adjustment mechanism (20) and the workpiece itself can be moved by the positioning mechanism (21) in the X-Y plane.

In the element (10) one or more zones are formed, in each of which the Pancharatnam-Berry phase (PBP) varies smoothly according to the rule set for that zone.

Figure 3:
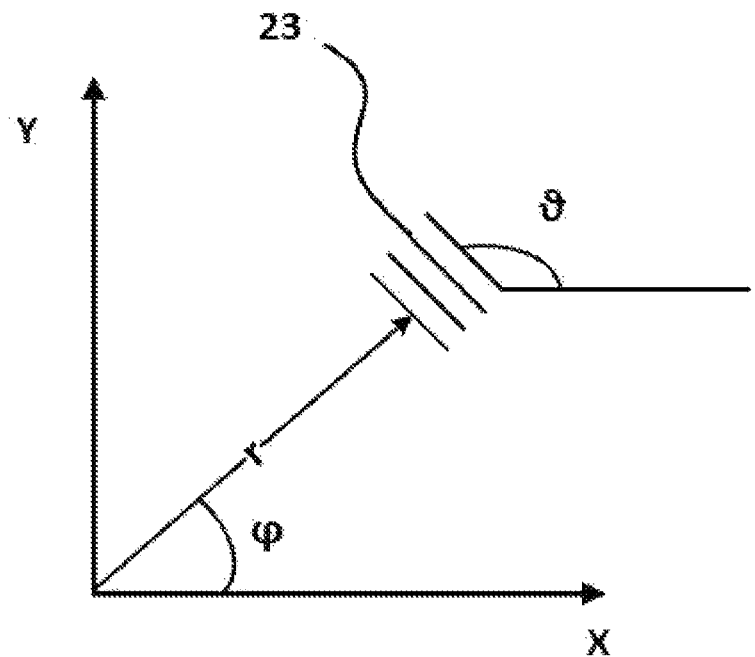
FIG. 3 shows the coordinates of a birefringent structure, formed in a beam transforming element, in polar and rectangular coordinate systems.

At each point of the cross-section, the PBP value is set by the periodic nanoplate structure (23), formed in the workpiece body (FIG. 3), the orientation of which in the element is described by dependency in rectangular coordinates $$\vartheta_i = f_i(x_i, y_i) \quad [3]$$

Where $\vartheta_i$ is the turning angle of the periodic structure to the coordinate axis in the i-th zone, described by function $f_i$ or in polar coordinates:

$$\vartheta_i = f_i(r_i, \varphi_i) \quad [4]$$

here $r_i = \sqrt{x_i^2 + y_i^2}$ and $\varphi_i$ are the polar coordinates of that periodic structure in the cross-section of the element.

Figure 4:
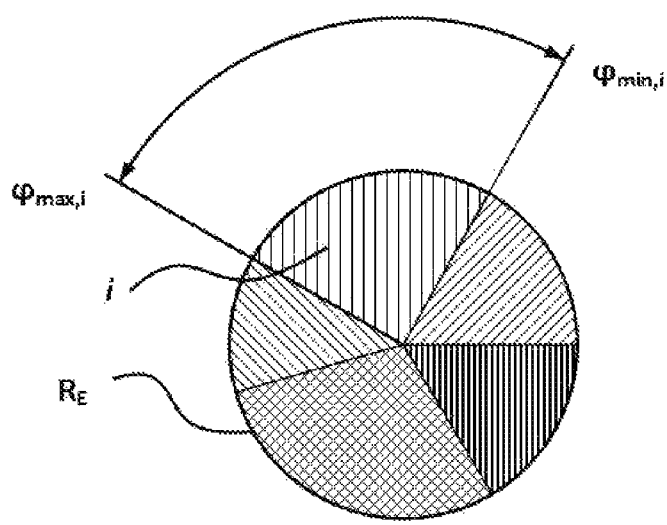
FIG. 4 shows the areas of PBP change in the element arranged in sectors.

In order to obtain distributions with axial symmetry (circular or elliptical), these zones can be arranged in both sectors (FIG. 4)

$$\vartheta_i = f_i(0 \leq r_i \leq R_E, \varphi_{min,i} \leq \varphi_i < \varphi_{max,i}) \quad [5]$$

Where $R_E$ is the radius of the element, $\varphi_{min,i}$, $\varphi_{max,i}$ is the angle of the sector start and end in polar coordinates.

Figure 5:
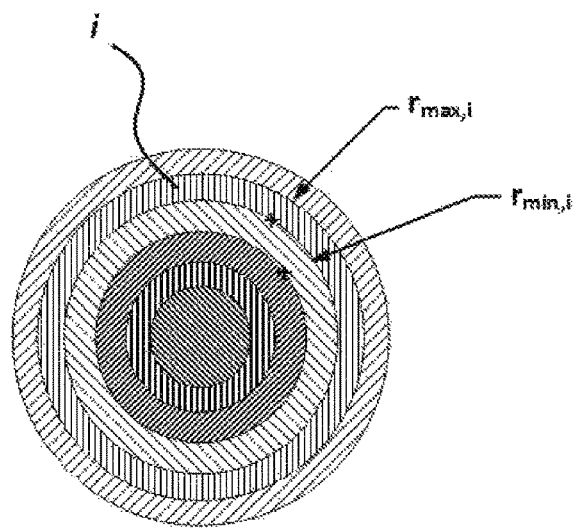
FIG. 5 shows the areas of PBP change in the element arranged concentrically.
Figure 6:
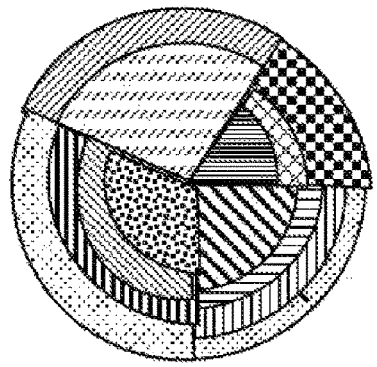
FIG. 6 shows the most common arrangement of PBP change zones in an element, where PBP variation in different sectors also depends on the distance of the birefringent structures from the center of the element.

Both concentric rings (FIG. 5)

$$\vartheta_i = f_i(r_{min,i} \leq r_i < r_{max,i}, 0 \leq \varphi_i < 2\pi) \quad [6]$$

Where $r_{min,i}$, $r_{max,i}$ are the values of the start and end radii of the ring and rings, divided into sectors (FIG. 6)

$$\vartheta_i = f_i(r_{min,i} \leq r_i < r_{max,i}, \varphi_{min,i} \leq \varphi_i < \varphi_{max,i}) \quad [7]$$

Figure 7:
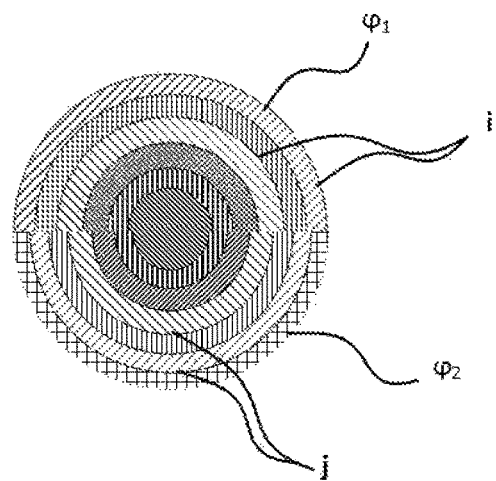
FIG. 7 shows a specific case where PBP transformation in two 180° sectors have different dependencies on the distance from the center.

In an individual specific case, two zones are formed in the element with sectors $0 < \varphi_1 \leq \pi$ and $\pi < \varphi_2 \leq 2\pi$, change of PBP is formed in each sector by rings, in each of which the PBP change is described by function, that is specific to that ring (FIG. 7):

$$\vartheta_{ij,\varphi n} = f_{ij}(r_{ij}, \varphi_n) \quad [8]$$

Where $\vartheta_{ij,\varphi n}$ is the orientation angle of the PBF in the n-th sector and the ring for j, where i and j are the ring number in the 1st or 2nd sector, respectively (FIG. 7).

If functions are selected in a way that $$\vartheta_{i,\varphi 1} = f_i(r_i, \varphi_1) = \sin(r_e * \pi/180) * a \quad [9]$$

and $$\vartheta_{j,\varphi 2} = f_j(r_j, \varphi_2) = \sin(r_e * \pi/180 + \pi) * a \quad [10]$$

where $r_e$ is the radius of the element, a is the factor which determines the angle of convergence of the sub-beams The PBP element forms a non-diffractive beam.

Figure 8:
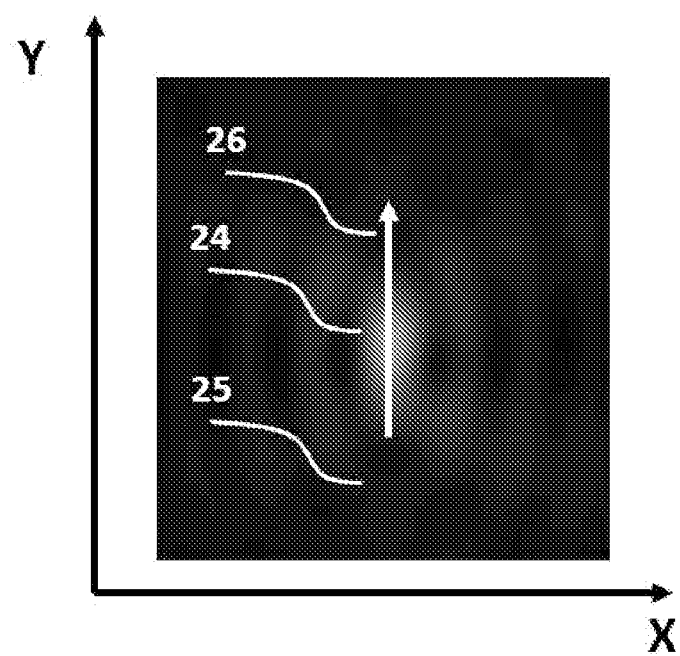
FIG. 8 shows a measured transverse energy distribution generated by the element from FIG. 7.
Figure 9:
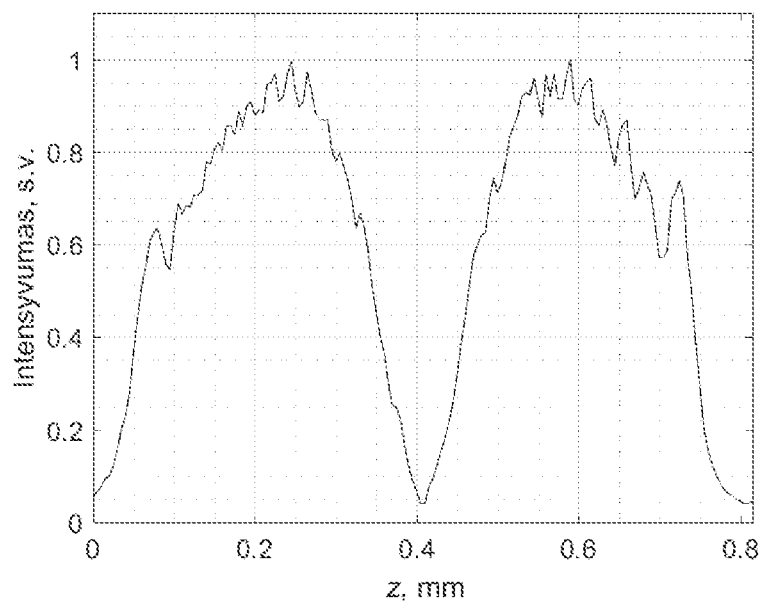
FIG. 9 shows a change in the energy of FIG. 8 distribution along the direction of light propagation.

By placing the element (10) described by functions [9] and [10] in the laser light beam, an elliptical symmetry distribution is formed behind the element (FIG. 8) with one or more maximums in the direction of light propagation (FIG. 9). The intensity distribution between the maximums is determined by the nature of the polarization (linear, circular, or elliptical) of the light aimed at the element. Main maximum (24) is formed in the distribution, most of the beam energy is concentrated in it, and elliptical secondary maximums (25) are formed around it as well. The direction of the longitudinal axis (26) of the distribution ellipse (FIG. 8) depends on the orientation of the sectors of the element in a plane perpendicular to the direction of the propagation of light.

By focusing the distribution, created by the element, in the glass and after the pulse power density exceeds the limit $\rho_{rib}$, the value of which depends on the composition of the glass, hollow damage areas form in the glass body, the shape of these areas mimics the intensity distribution in the focal area. For example, glass in borosilicate glasses with high (~6-10%) content of alkaline earth elements $\rho_{rib} \approx 1 \times 10^{15}$ Wcm$^{-3}$, while in glasses without alkaline earth elements this limit is $\rho_{rib} \approx 5 \times 10^{14}$ Wcm$^{-3}$. The energy distribution is formed in such a way that $\rho_{rib}$ would be exceeded only at the main maximum (24).

Figure 10:
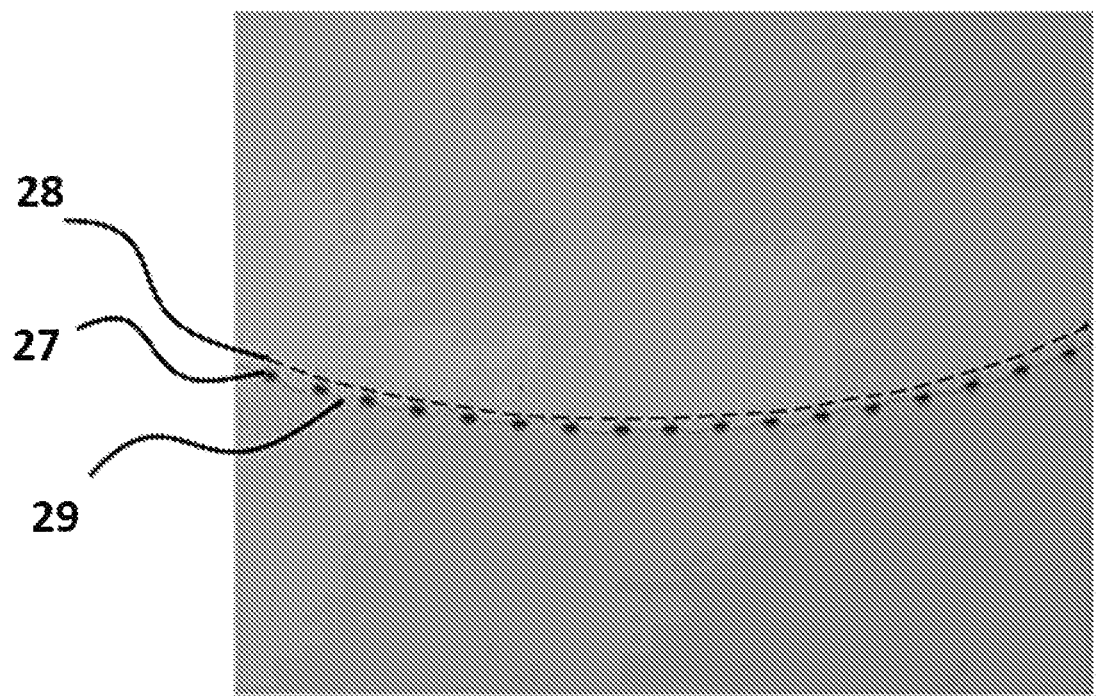
FIG. 10 shows a controlled direction damage line obtained by rotating an element around the axis of a beam of light.

By moving the glass workpiece (19) in the X-Y plane, perpendicular to the direction of the light propagation, and simultaneously arranging the elliptic damage areas (27) are arranged along the desired cut line (28) by changing the position of the longitudinal axis of the distribution ellipse by a turning mechanism (12). As the power density $\rho$ of secondary maximums (25), overlapping from adjacent pulses, exceeds the split occurrence threshold $\rho_{sk} = \rho_{rib}/6 \div \rho_{rib}/3$, characteristic for that specific glass, the occurring chemical changes (29) (FIG. 10) that cause the occurrence of physical stress as well, merge the physical damage areas.

Figure 11:
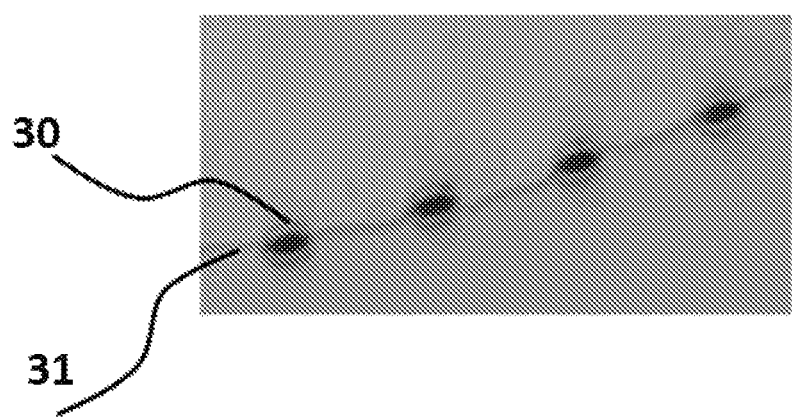
FIG. 11 shows the damage of that line where fields of physical (puncture) and chemical (bond rearrangement) damage are discerned.
Figure 12:
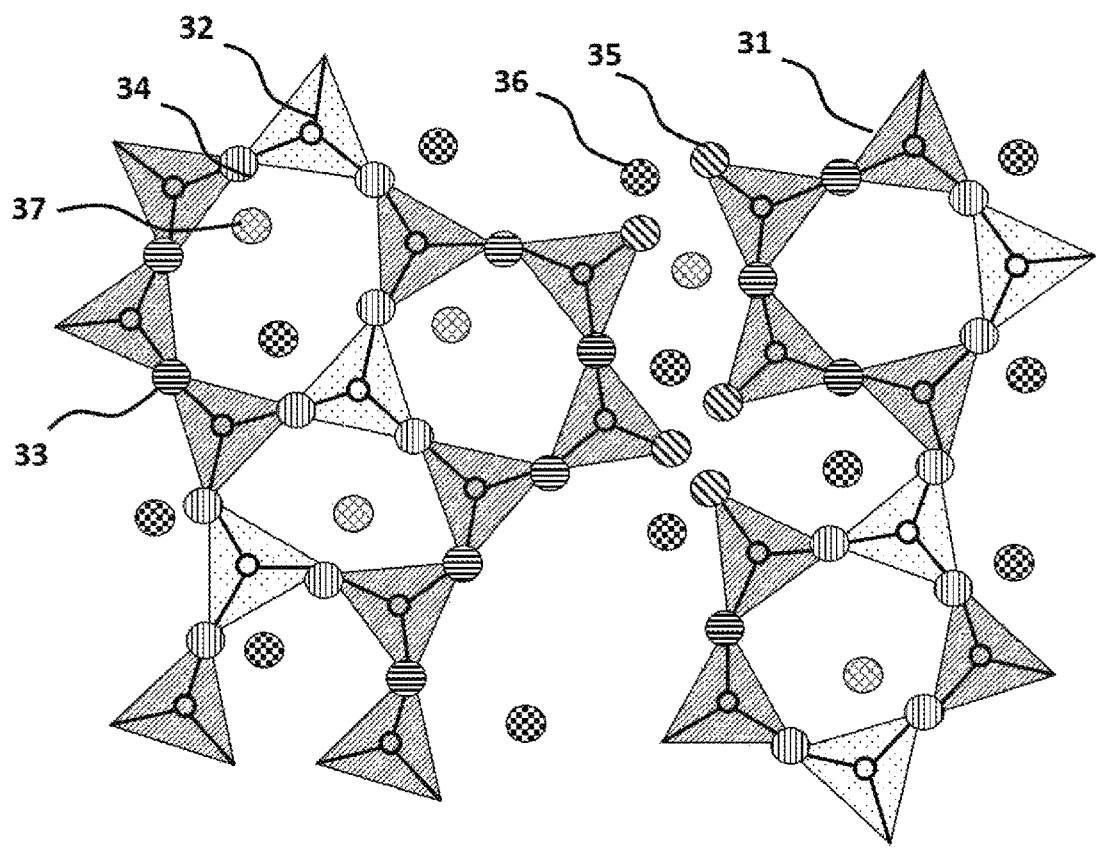
FIG. 12 shows the structure of the most common earth alkaline aluminosilicate glass.

Areas, where the physicochemical properties of the glasses are altered form around damage areas (30, FIG. 11). Glass is a network of oxide structures in which alkali and/or alkaline earth metal cations are mixed in. In an individual case, an aluminosilicate glass with an Al/Si content of $\geq \frac{1}{3}$ (FIG. 12) consists of tetrahedrons of oxygen atoms with silicon (31) or aluminium (32) atoms in the center. Apexes of some of these tetrahedrons are joined by Bridging Oxygen (BO) bridges, which are classified by type of bond into BO1 (33), which join Si—O—Si tetrahedrons and BO2 (34), which join Si—O—Al tetrahedrons. The free oxygen atoms in the corners are called Non-Bridging Oxygen (NBO) (35). Between these relatively orderly structures, the cations of alkali metals (AM, 36) and alkaline earth metals (EM, 37) are relatively freely interposed, and the presence of these cations affect the formation of oxygen bridges and the ratio of BO1/BO2 bridge amounts. It is known that when atom amount AM/Al$\approx$1 the ratio of the amount of different types of bridges BO2/BO1$\approx$3, NBO/BO2=0, whereas in glass workpieces with AM/Al$\approx$0.2 this ratio BO2/BO1$\approx$0.3., and non-bridging oxygen bonds NBO/(BO1+BO2)$\approx$0.1 are observed as well As the laser pulse affects such glass workpieces, a significant change in the BO/NBO ratio is observed. It is established that in most glasses, after the laser pulse energy density exceeds $2 \times 10^3$ J/cm$^2$, the ratio BO/NBO$\approx$0.3, i.e., amount of BO bridges is reduced by more than ~3 times when compared to the glass unaffected by laser. As the glass is affected by the laser light, BO-type bridges break and form Oxygen Deficiency Centers (ODC) with excess silicon or aluminium (ODC I) $\equiv$Si—Si$\equiv$ and $\equiv$Al—Al$\equiv$ or with free bonds (ODC II) $\equiv$Si$^0$ ir $=$Al$^0$. Also Non Bridging Oxygen Hole Centers (NBOHC) such as $\equiv$Si—O° or $\equiv$Al—O° form in the structure. All of these defects are significantly more chemically active than glass unaffected by laser, so that when the affected workpiece is placed into an alkali solution, the hydroxyl anions react with the opened bonds and form soluble products such as:

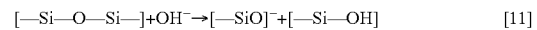

[11]

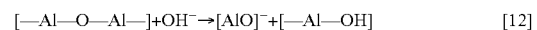

[12]

The oxides of network modifying alkaline earth metals (Ca, Mg, Ba, Zn), which form when metals bond with the freed oxygen, do not react with alkali directly, but are soluble in them. Meanwhile, the alkali metals (Li, Na, K) pass into solution in the form of hydroxides.

Figure 13:
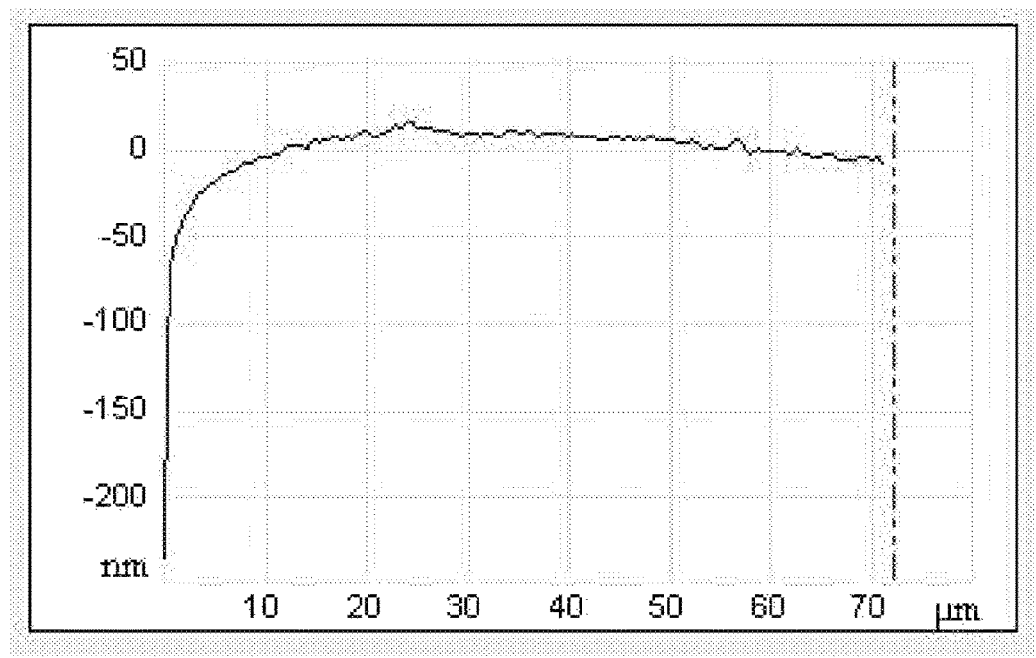
FIG. 13 shows a cut edge profile measured by an atomic force microscope (AFM).

Thanks to the above processes, the glass area, affected by secondary maximums of the pulse, is dissolved in alkali up to 1000 times faster than the unaffected area. This means that by forming an area with a high content of free oxygen or active silicon and aluminium bonds in the line of desired cut, the alkali will essentially dissolve only the area of the cut without touching the workpiece material, which does not need to be removed. This results in extremely high precision cuts. As can be seen from FIG. 13, only a slope of 0.05-0.1 μm (50-100 nm) is formed on the edge of the cut.

The invention claimed is:

1. A method for processing transparent materials by forming a cut or split surface in a workpiece material, comprising two processing phases:
    phase A in which the cut or split surface formation with a laser without a complete separation of workpiece parts from one another is performed, wherein phase A comprises steps of:
        (A.1) generating a coherent ultra-short pulse laser radiation beam of $TEM_{00}$ mode by the laser,
        (A.2) directing the generated laser radiation beam into an optical system that includes an adjustable beam expander, attenuator and optionally a quarter-wave plate to set beam diameter, a total pulse energy, and light polarization of the laser radiation beam,
        (A.3) directing the laser radiation beam of step (A.2) into an optical element which transforms the laser radiation beam received by the optical system in accordance with a predetermined rule into a formed laser radiation beam, wherein the transformation of the laser radiation beam, according to the predetermined rule, takes place in the optical element, the optical element comprising a birefringent structure that smoothly changes a Pancharatnam-Berry phase (PBP) of a perpendicular laser radiation beam, wherein at least two regions of the birefringent structure have different PBP transformation rules and orientation with respect to the laser radiation beam approaching the optical element and form at least two sub-beams, to change energy, phase, and polarization distribution of the sub-beams, depending on parameters of the laser radiation beam, and approach of the laser radiation beam to the optical element, such that the polarization distribution is selected from a group consisting of linear, circular, radial azimuthal, and an orientation of a linear polarization plane with respect to a direction of a trajectory of the cut or split in the workpiece material,
        wherein the sub-beams interfere with each other to obtain a total non-diffractive laser radiation beam having an off-center symmetrical distribution of a set energy, phase, and a polarization focal line, with elongation in a plane, perpendicular to the laser radiation beam propagation direction,
        wherein the off-center symmetrical distribution is obtained by changing the parameters of laser radiation beam, formed during step (A.2), approaching the optical element, wherein the off-center symmetrical distribution of the non-diffractive laser radiation beam has a main oblong energy maximum in a perpendicular plane of light propagation, which contains energy of the pulse of the laser radiation beam with a density ρ, and a secondary energy maximums elongated in the perpendicular plane, with the density between ρ/6 and ρ/3,
        A.4) localizing the formed laser radiation beam in the workpiece, the material of the workpiece which is transparent to the laser radiation beam, wherein the parameters of pulses of the laser radiation beam ensure that the energy of the pulse with the density in a focal area of the workpiece material, is sufficient to change properties of the workpiece material to create a processed workpiece, wherein each pulse of the laser radiation beam forms an elongated general damage region consisting of physical changes, formed by cavities and/or cracks due to an effect of the main oblong energy maximum and chemical changes in the workpiece material due to effects of the secondary energy maxima, wherein elongated general damage region in the workpiece is oriented along the trajectory of the cut or split by rotating a contact element around its axis and moving the processed workpiece in a controlled manner so that formed elongated areas of damage are positioned lengthwise one after another, due to physical changes in the workpiece material, with gaps along the trajectory of the cut or split;
        A.5) controlling movement of the processed workpiece with respect to the laser radiation beam so that a laser radiation beam focus point in the workpiece shifts respectively, creating a number of damaged areas and forming the cut and/or split in the surface of the processed workpiece,
    phase B in which a complete separation of workpiece parts from each other based on the cut and/or split in the surface of the processed workpiece formed during phase A is performed by placing the workpiece in a chemical medium to etch the workpiece material at the damaged areas,
    wherein the energy of the pulse of the laser radiation beam, power of the laser radiation beam and movement speed of the workpiece are selected such that the damage areas, due to chemical changes in the workpiece material, extend the damage areas, that occurred due to physical changes in damage, along the trajectory of the cut such that adjacent common damage areas adjoin or partially overlap; and in phase B, the chemical medium would act on the workpiece material simultaneously throughout an entirety of the trajectory cut.

2. The method according to claim 1, wherein the common damage areas are elongated and are in an elliptical plane perpendicular to the direction of light propagation and of approximately constant size, varying by no more than +/−15% from a mean value along the direction of the projected cut or split surface.

3. The method according to claim 2, wherein the trajectory of the cut or split is formed from the elongated common damage areas by spreading more than one non-diffractive beam along the trajectory of the cut or split at distances comparative to transverse dimensions of the laser radiation beam.

4. The method according to claim 2, wherein the elongated common damage areas due to physical changes in the workpiece are arranged with a step that exceeds the width of the damage by at least 1.5 times.

5. The method according to claim 1, wherein in phase B, the workpiece is successively immersed into one or more chemically active liquids selected from a group consisting of: KOH, $Na_2CO_3$, HF, and HCl solutions, in order to transfer and dissolve products formed and remaining in the region of damage areas of the workpiece.

6. A device for processing of transparent materials comprising:
    a laser generating a beam of ultrashort pulse laser radiation $TEM_{00}$ mode, directed at an optical system including an attenuator built from a half-wave plate and polarizer, an adjustable beam expander built from negative and positive lenses and a quarter-wave plate inserted upon for changing pulse energy, light polarization, and diameter of a laser radiation beam from the laser, whereby the laser radiation beam formed in the optical system is localized through an optical element located outside the optical system in a path of the laser radiation beam to transform an incoming laser radiation beam from the laser in a processed workpiece in accordance with a rule determining relevant beam shape, the optical element having a birefringent structure that uniformly changes a Pancharatnam-Berry phase (PBP) of a perpendicular laser radiation beam, whereby at least two regions of the birefringent structure with different PBP transformation rules and their orientation with respect to the laser radiation beam approaching the optical element are located in the workpiece, the two regions of the birefringent structure form at least two interfering sub-beams to produce an aggregated non-diffractive laser radiation beam having an off-center symmetrical distribution of a predefined energy, a phase, and a polarization focal line, with an elongation in a plane perpendicular to a laser radiation beam propagation direction, with a main energy maximum and secondary energy maximums, the aggregated non-diffractive laser radiation beam being localised in the workpiece via focusing optics, a mounting mechanism in which the optical element is mounted, rotating around its axis for changing position of the optical element and a birefractive structures formed therein, whereby the material of the workpiece is mostly transparent to the laser radiation beam, wherein parameters of a pulse of the laser radiation beam formed in the optical system ensure laser radiation energy density sufficient to change properties of the workpiece material in a focal area, a controllable positioning mechanism for moving processed workpiece with respect to the laser radiation beam so that a laser radiation beam focus point in the aforesaid workpiece moves, creating damaged areas and forming a surface of a desired trajectory cut and/or split in the workpiece, a vessel containing a chemical medium for etching the workpiece material in the damaged areas and to place the workpiece therein and to separate its parts from each other according to the formed desired trajectory cut of the cutting and/or splitting surface, whereby rotating the optical element by the mounting mechanism, an orientation of the created damaged areas elongated along the trajectory cut is changed, and the controllable positioning mechanism moves the workpiece in a way that damage areas, comprising physical and chemical changes in the workpiece material, arranged lengthwise one after another along the desired trajectory cut of the cutting and/or splitting surface, so that the formed elongated damage areas are positioned lengthwise one after another, due to physical changes in the workpiece material, with gaps along the desired trajectory cut and/or split and the damage areas, due to chemical changes in the workpiece material, extend the damage areas that occurred due to physical changes in the damage areas, along the trajectory cut such that common adjacent damage areas adjoin or partially overlap.

* * * * *